(12) United States Patent
Armstrong et al.

(10) Patent No.: US 6,807,423 B1
(45) Date of Patent: *Oct. 19, 2004

(54) COMMUNICATION AND PRESENCE SPANNING MULTIPLE ACCESS NETWORKS

(75) Inventors: Steven M. Armstrong, Nepean (CA); Eric W. Parsons, Ashton (CA); Elwyn B. Davies, Ely (GB); Andrew Newton Harker, Bishops Stortford (GB); David Robert Stringer, Knebworth (GB)

(73) Assignee: Nortel Networks Limited (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/460,780

(22) Filed: Dec. 14, 1999

(51) Int. Cl.[7] .................................................. H04Q 7/00
(52) U.S. Cl. ..................... 455/440; 455/433; 370/328
(58) Field of Search ..................... 370/254, 259–261, 370/263–265, 310, 313, 328, 342–344, 347, 351, 352, 389, 464–467

(56) References Cited

U.S. PATENT DOCUMENTS

| | | | | |
|---|---|---|---|---|
| 3,816,668 A | * | 6/1974 | Giesken ..................... | 379/273 |
| 5,197,092 A | * | 3/1993 | Bamburak ............. | 379/211.05 |
| 5,432,841 A | * | 7/1995 | Rimer ......................... | 455/457 |
| 5,918,181 A | * | 6/1999 | Foster et al. ............. | 455/456.1 |
| 6,584,314 B1 | * | 6/2003 | Haumont et al. ........... | 370/337 |

* cited by examiner

Primary Examiner—Hassan Kizou
Assistant Examiner—David Odland
(74) Attorney, Agent, or Firm—Steubing McGuinness & Manaras LLP

(57) ABSTRACT

A personal communications portal maintains presence information about a user who may be available at one or more terminal devices on one or more access networks comprising a multiple access network. The access networks may operate in different transmission modes and may utilize different signaling formats (text, graphics, voice, video, etc.). A watched party specifies preferences as to who may contact him, at what times, on what kind of network and device. A watching party requesting to contact the watched party may be given direct contact information for contacting the user, may be given indirect contact information for contacting the user without being informed of the watched party's whereabouts, may be placed directly in communication with the watched party, or may forward a message to the user. If the caller is forwarding a message to the user or is placed in communication with the user, and if caller and user are using different transmission modes or different signaling formats, the personal communications portal mediates communication appropriately. Further, the personal communications portal may determine the watched party's physical location based upon the presence information received from the multiple access network and possibly from information received related to events which take place outside of the multiple access network, but which are reported to the portal.

47 Claims, 10 Drawing Sheets

COMMUNICATION AND PRESENCE SPANNING MULTIPLE ACCESS NETWORKS

FIELD OF THE INVENTION

This invention relates generally to networks, and more particularly to tracking a user's presence and availability to receive messages while employing different networks and/or different network devices and/or in different network locations.

BACKGROUND OF THE INVENTION

Recent advances in personal communications have enabled people to employ a variety of communication devices (e.g. one or more wireline telephones such as an office phone and a home phone, one or more wireless telephones, one or more desktop PCs equipped with a connection to the Internet such as through a modem connected to a plain old telephone service (POTS) line, ISDN line, T1 line, T3 line, digital subscriber line (DSL) line, or cable, one or more portable PCs similarly equipped, a FAX machine, a pager, a personal data assistant (PDA), etc.). Further, the capabilities of individual devices continue to expand (e.g. modern voice telephones are often equipped with displays, etc.). Many of these devices provide access to one or more networks, such as the Internet, PSTN, etc.

There is currently a thrust to develop a method of delivering a variety of services independent of the access network employed. Many of the services involve mobility (e.g., the ability to access location-specific travel services such as local restaurant listings, guides, and reservations while on the road).

When considering the delivery of services to mobile users, it is useful to distinguish between two types of mobility: terminal mobility (i.e., the ability for an individual to roam with a particular device across some geographic location without interrupting service) and personal mobility (i.e., the ability for an individual to move from one device to another, while seamlessly preserving access to a common set of services). In some cases, it is desirable to provide the ability to migrate a service from one device to another without interrupting the service.

Terminal Mobility

Considerable effort has been devoted to supporting terminal mobility. Wireless LANs (e.g., IEEE 802.11) and wireless cellular networks typically implement terminal mobility at layer 2 (relative to Internet Protocol (IP)). In addition, Mobile IP (RFC 2002) is a layer-3 solution that has been developed for generalized IP networks.

One of the challenges in providing terminal mobility is the ability to route packets efficiently in the network. Essentially, once a node is associated with a given IP address, packets destined to that node may only be routed to the topological location corresponding to the address, which may be distant from the node's physical location. Thus, if an individual from Europe visits North America, packets routed to the IP address corresponding to the individual's device will be routed through Europe even if communicating with local services. As such, when roaming across wide geographic areas (e.g., country to country), it may be preferable to modify a node's IP address, even at the cost of losing existing connections.

Personal Mobility

Traditionally, user services have been associated with specific access networks which in turn have been associated with specific devices (PCs may send messages only to other PCs over the Internet, telephones may send voice messages only to other telephones over the public switched telephone network (PSTN), etc.).

FIG. 1 generally depicts the conventional situation. A user's receipt of information from a service or of messages from another user has traditionally depended on a user's presence at a particular telephone set, a particular email address, etc. A barrier to achieving widespread personal mobility has been the lack of unification among access networks.

Instant messaging services are coming into widespread use. In an instant messaging service, a user may be reached only when on line in a particular access network (e.g., when logged on to an Internet service provider (ISP) under a login name that is registered with the instant messaging service, etc.). If a user is reachable by some other means (wireline phone, cell phone, pager, PDA, FAX, etc.), the present instant messaging services have no way to determine that the user is available and thus list the user as unreachable or logged off.

In other forms of user-to-user communication (e.g. telephone communications), a caller is currently unable to reach a called party who is unreachable at a telephone number known to the caller. For example, a potential called party staying in a hotel is reachable through the hotel's telephone number, but potential callers may not know that the called party is away from home. Although they might know the called party's home phone number and might call it, they would not succeed in speaking to the called party.

Thus, in conventional systems, end-user services are associated with specific access networks, which in turn are associated with specific devices having specific addressing (specific telephone numbers, specific email addresses, etc.).

SUMMARY OF THE INVENTION

The present invention provides systems and methods of monitoring a presence on a multiple access network and communicating over the same.

An embodiment of the invention includes an apparatus for monitoring a presence of at least one watched party on a multiple access network. The multiple access network includes various access networks, and the apparatus includes a processor in communication with the multiple access network. The apparatus also includes event detectors, each of which is operatively connected between at least one of the access networks and the processor. Each event detector is configured to detect a change in presence of the watched party on the respective access network and communicate a presence status to the processor, based upon the change in presence of the watched party on the respective access network.

Another aspect of the invention provides a method of monitoring a presence of at least one watched party on a multiple access communication network, which includes various access networks. The method includes detecting a presence status of the watched party on each of the access networks and reporting the presence status for each of the access networks to a central location. The method further includes detecting a change in the presence status on at least one of the access networks and reporting the change in presence status to the central location.

Still another aspect of the invention provides an apparatus for monitoring a presence of at least one watched party on a multiple access network which includes a processor module for processing presence information about the watched party. The apparatus further includes a detection module, operatively connected between the access networks of the multiple access network and the processor module. The detection module is for detecting a presence status of the watched party on the access networks and for detecting a change in the presence status on the access networks.

DESCRIPTION OF THE PREFERRED EMBODIMENT

The present invention provides an instant messaging system, which has the ability to span multiple communication networks. An aspect of the invention provides a watching party (a party attempting to contact or learn the status of another party) with information about a watched party (a party who the watching party is attempting to contact or determine the status of) and the ability to contact the watched party. Those skilled in the art will recognize that watched party may also be a watching party and visa versa.

The information provided could include the physical location of the watched party, the type of communication network(s) the watched party is available on, the destination address of the watched party for each communication network the watched party is available on, and/or the watched party's contact preference, etc. Another aspect of the invention provides access to the watched party, which does not require the watching party to have information about the destination address of the watched party. In this configuration, the watching party could enter the watched party's name (or other identifier) and automatically be connected to the watched party based upon information entered by the watched party. The watched party could enter destination address information for each communication network into the system. Thus, when the watching party attempts to contact the watched party the system could route the communication based upon the information entered by the watched party and the availability of the watched party on a particular communication network. If the watched party is simultaneously available on more than one communication network, the system could route the communication based upon a default hierarchy of communication network preferences or based upon a watched party determined hierarchy. Such a configuration enables the watched party to change one or more destination addresses without the need to disseminate the changed information to all possible watching parties. In another aspect of the invention, the watched party may set up rules about who may contact the watched party, at what times, how often, how often during particular times, in what mode of communication a particular watching party may contact the watched party, etc.

Another aspect of the invention enables the system to collect and correlate information about the watched party from different sources, then correlate the information and determine the status of the watched party (e.g. if a calendar entry for the watched party on Dec. 1, 1999 states a planned business trip, and the location of the watched party's wireless phone on Dec. 1, 1999 is determined from the cell location to be near an airport then the system could deduce that the watched party is heading to the airport to catch a plane for the trip).

Figure 1:
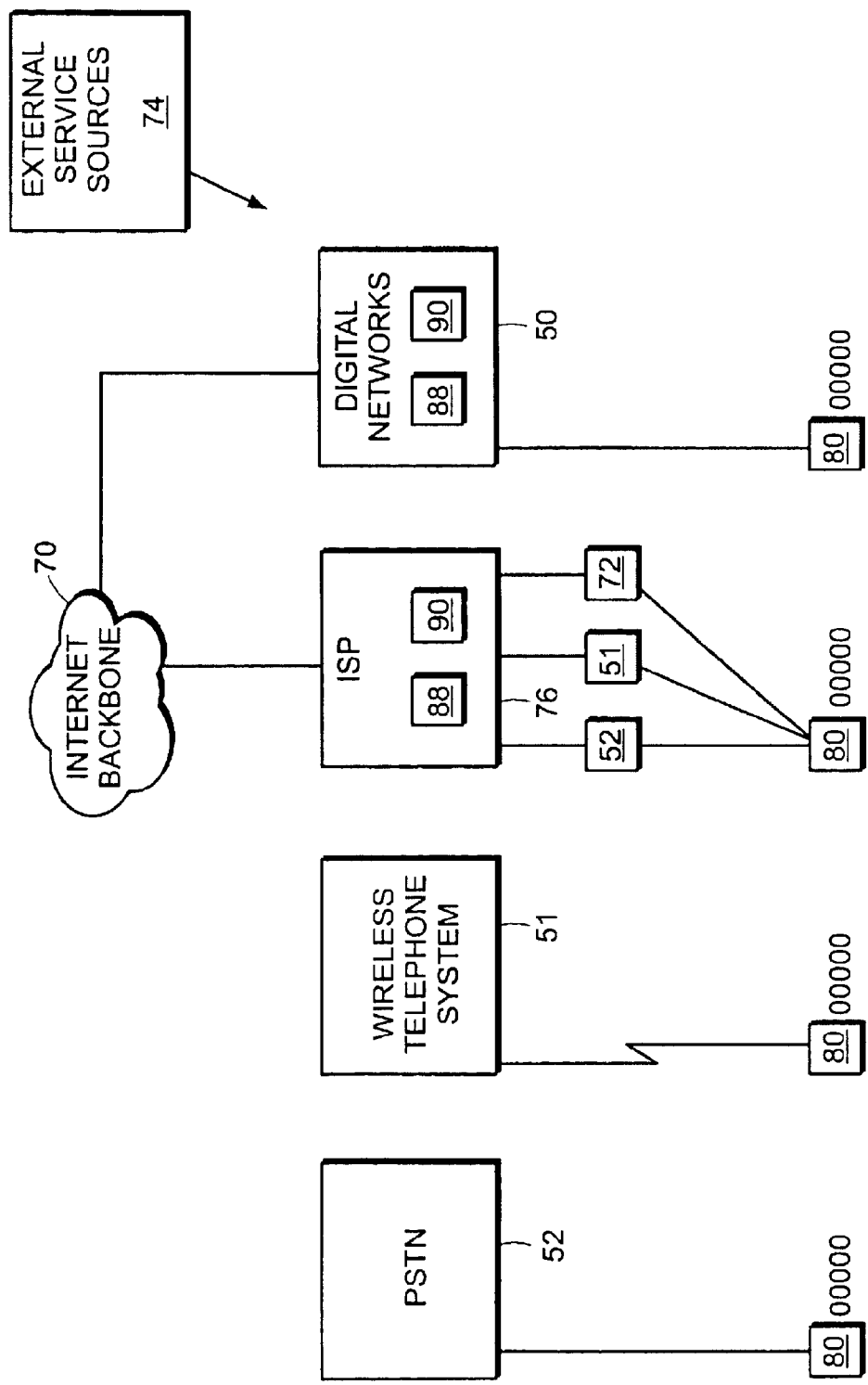
FIG. 1 depicts a conventional multiple access communication network.
Figure 2:
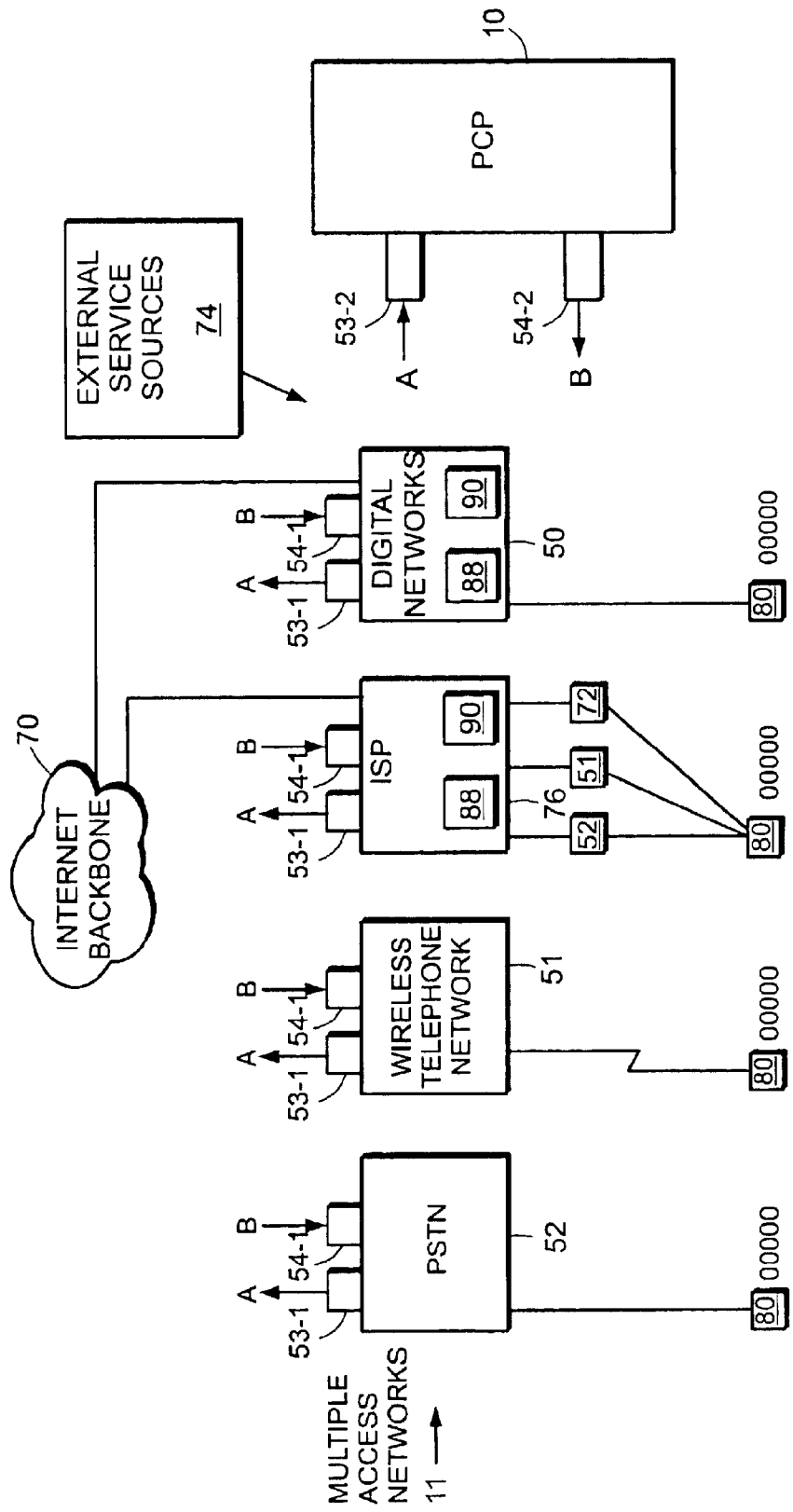
FIG. 2 depicts a multiple access communication network according to the present invention.

FIG. 2 depicts a communication configuration according to the present invention. Access networks 50, 51, 52, and 76 of FIG. 1 are collectively denominated as multiple access network 11. In addition to the elements shown in FIG. 1, a personal communications portal (PCP) 10 is provided.

The term "multiple access network" refers to a communications network which includes two or more different types of communications networks. It may also be a network accessed using different types of terminals. A public switched telephone network (PSTN) that is connected to a wireless telephone network is an example of a multiple access network. The overall network is made up of two different types of communications networks and the overall network (the combination of the PSTN and the wireless network) can be accessed using different types of terminals such as a conventional telephone, a facsimile machine, a wireless telephone, a modem, etc. The component communications networks within a multiple access network can be connectionless networks (e.g. the Internet etc.), connection-oriented networks (e.g. the PSTN), etc.

The term "access network" refers to a communications network, which is situated on the edge or periphery of a "core network" and through which users gain access to the core network. The term "core network" refers to a network that cannot be accessed directly by user-oriented terminal devices, but which is accessed by users indirectly through an access network.

The term "PCP" refers to an automated system for use in a multiple access network which provides a single point of presence for a watched party 13 of that multiple access network at a terminal device 80 connected to one or more of the access networks 50, 51, 52, and 76. A watched party 13 may simultaneously have access to several terminal devices 80 on one or more of access networks 50, 51, 52, and 76. The watched party 13 may also have access to a single device capable of accessing more than one of the access networks 50, 51, 52, and 76. A point of presence is a source of information about whether a watched party 13 is available for contact on a multiple access network 11, which access networks the watched party 13 is presently available on, where that watched party 13 is located on each access network, and/or by which method that watched party 13 should preferably be contacted. A PCP 10 provides a single point of presence despite the fact that a watched party 13 may have more than one terminal and/or different types of terminals for accessing the network in different modes and possibly by different access networks. A PCP 10 may also provide context information rather than just raw presence information. Raw presence information is unprocessed information about the availability, location and capability of a watched party 13 on the communications network. A PCP 10 processes raw presence information according to rules or other pre-specified criteria about watched parties 13 to provide context (e.g. status, location, etc.) information for human operators to understand and work with.

Associated with PCP 10 are one or more event gateways 53-2 and one or more connection gateways 54-2. Coupled to event gateway 53-2 is an event gateway 53-1 associated with each network of multiple access networks 11. Coupled to connection gateway 54-2 is a connection gateway 54-1 associated with each network of multiple access networks 11.

Though event gateways 53-1 and 53-2 may be in separate locations, each path through them (from one access network to PCP 10) may be logically considered a single entity. Similarly, each path through connection gateways 54-1 and 54-2 (from PCP 10 to one access network) may be logically considered a single entity.

PCP 10 maintains and provides presence information about a watched party 13 by gathering it from event gateways 53-1 throughout the system. The presence information maintained is under the watched party's control, as is the subset of the presence information that is to be provided to callers. PCP 10 provides the following functionality:

- Managing personal presence information via rules defined by watched parties or default rules specifying how watched parties 13 may be contacted:
  - On what kind of device;
  - By whom;
  - At what times;
- Subscribing to other watched parties' 13 presence information for notification of changes (i.e., tracking the availability of certain watched parties 13);
- Viewing the presence information of watched parties 13 in real time (i.e., seeing in what ways a particular watched party 13 is available-if at all at a particular time) and (optionally) receiving continuous updates of this presence information;
- Establishing communication with watched parties 13 via one of the currently available communication types that are included as part of the watched party's presence information.

Although a variety of devices may be employed by watched parties 13 to access PCP 10, these devices can be generally classified as voice devices and data devices. Although only one PCP 10 (with its associated gateways 53-2 and 54-2) is shown in FIG. 1, in practice there could be multiple PCPs 10. A particular watched party's presence information is tracked at a particular PCP 10 which is associated with one or more of the access networks 11.

Embodiments of the present invention are described below by way of example only. These examples represent the preferred embodiments currently known to applicants although they are not the only ways in which this could be achieved.

Figure 3:
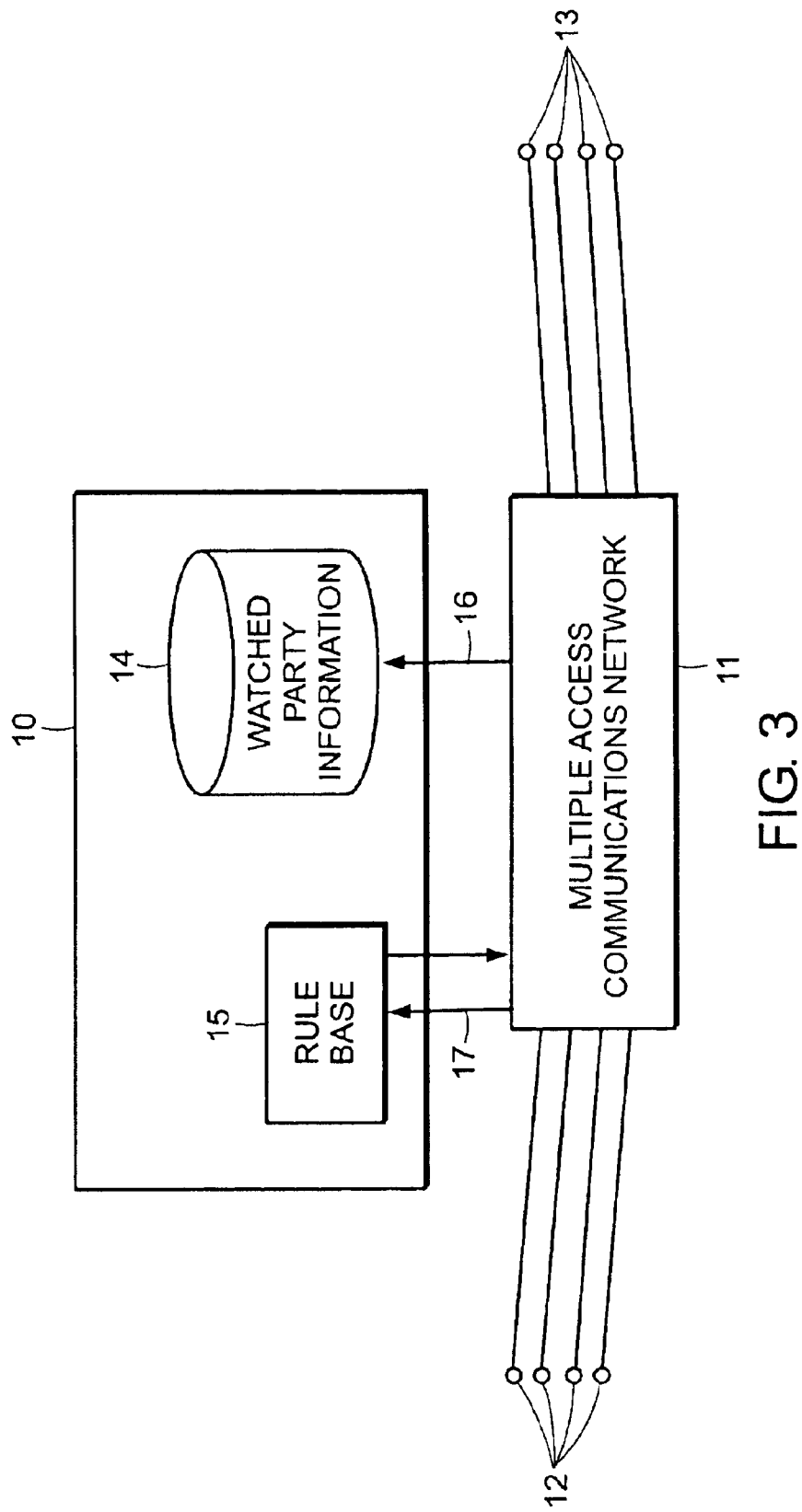
FIG. 3 is a schematic diagram of a personal communications portal.

FIG. 3 illustrates a PCP 10 which is connected to a multiple access network 11. Also connected to the multiple access network 11 are one or more watching parties 12 and one or more watched parties 13. Those skilled in the art will recognize that a watched party 13 can also be a watching party 12 and visa versa. In FIG. 3, each watching party 12 and each watched party 13 is shown as having a single connection to the multiple access network 11. However, a watched party 13 can be an individual who has one or more devices accessing the multiple access network 11 (e.g., a wireless telephone, a computer etc.). Similarly, a watching party 12 may have more than one connection to the multiple access network 11.

Each watched party 13 initially registers with the PCP 10 and is given a unique presence management identifier. During the registration process each watched party 13 enters personal information which is recorded in storage 14 in the PCP 10. For example, this information may include the watched party's email address, telephone number, and/or other contact details. Context information may also be included, such as information about whether the watched party 13 is a home worker or a mobile worker. Details about the watched party's preferences may also be recorded, such as which modes of communication are preferred at which times (e.g., email messages may be permitted at any time, while telephone calls may only be preferred during work hours) or which modes get priority, etc. Some of this information may be stored in the form of rules 15 within the PCP 10. Some rules 15 may be default rules that are preconfigured and others may be entered by watched parties 13.

A first set of inputs 16 is provided to the PCP 10 from the multiple access network 11. The input 16 represents the protocol for the presence information from a particular access network between event gateways 53-1 associated with each of the access networks forming multiple access network 11 and event gateway 53-2 associated with the PCP 10. Information about events that occur in the multiple access network 11 are provided to the PCP 10 via this first input 16. In this way events that are associated with the watched parties 13, (e.g., the event of a watched party 13 logging onto the Internet, movement of a watched party 13 between cells of a wireless communications network, remote login events, or keyboard presses by a watched party 13 on an Internet terminal, etc.) are accessed by the PCP 10.

If a watching party 12 attempts to contact a watched party 13 a contact request is sent to the PCP 10 by the watching party 12. The contact request reaches the PCP 10 via a connection request input 17. These requests may be received via protocols such as ICQ ("I seek you") or WAP™ (Wireless Access Protocol). The watching party 12 may not need to know any of the watched party's direct contact details to make this request; instead, PCP 10's identifier for the watched party 13 is used.

When the PCP 10 receives a presence request it determines whether the requested watched party 13 is available for contact and provides this information to the watching party 12 who made the request. For example, the PCP 10 may respond by providing a particular contact detail for the watched party 13 such as a proxy address that represents a telephone number. In doing this, the PCP 10 may choose the best mode of communication (e.g. email, fax, etc.) after taking into account the watched party's preferences as explained by the rules 15 and identity of the watching party 12. Alternatively, the PCP 10 may inform the watching party 12 that the watched party 13 is unavailable, may connect the watching party 12 to the watched party 13, or may give a list of available communication methods.

The watching party 12 may request that certain changes in presence information be relayed to the watching party 12 by the PCP 10 and thus the PCP 10 informs the watching party 12 once the presence information about the watched party 13 changes. That is, the PCP 10 is arranged such that when a change of state of a watched party 13 occurs, notifications about that change of state are sent to watching parties 12 who have logged an interest in that watched party 13 and in that particular state change.

In determining whether the required watched party 13 is available for contact, the PCP 10 uses the stored information 14 about the watched party 13, information about the required connection (e.g. size and type) and the rules 15. In addition, information about events from the multiple access network 11 may be used. For example, a request for preference information which includes the current methods of accessing a watched party 13 so that the watching party can send an instant message at 10 PM may be made. If the watched party 13 is on line but has configured rules 15 such that no instant messages should be accepted after 9 PM then the PCP 10 refuses the request. Those skilled in the art will recognize that the system could be configured to buffer one or more messages until the watched party 13 becomes available. However, the watched party 13 may have set preferences to allow family members to send instant messages at any time. In this case, the request could be granted.

The PCP 10 may allow watching parties 12 to send messages and communications to watched parties 13 even when those watched parties 13 are not "present" or available on the communications network. For example, when a watched party 13 is not logged onto the Internet he or she may allow the PCP 10 to forward email messages and faxes, etc.

Services as Parties

Figure 4:
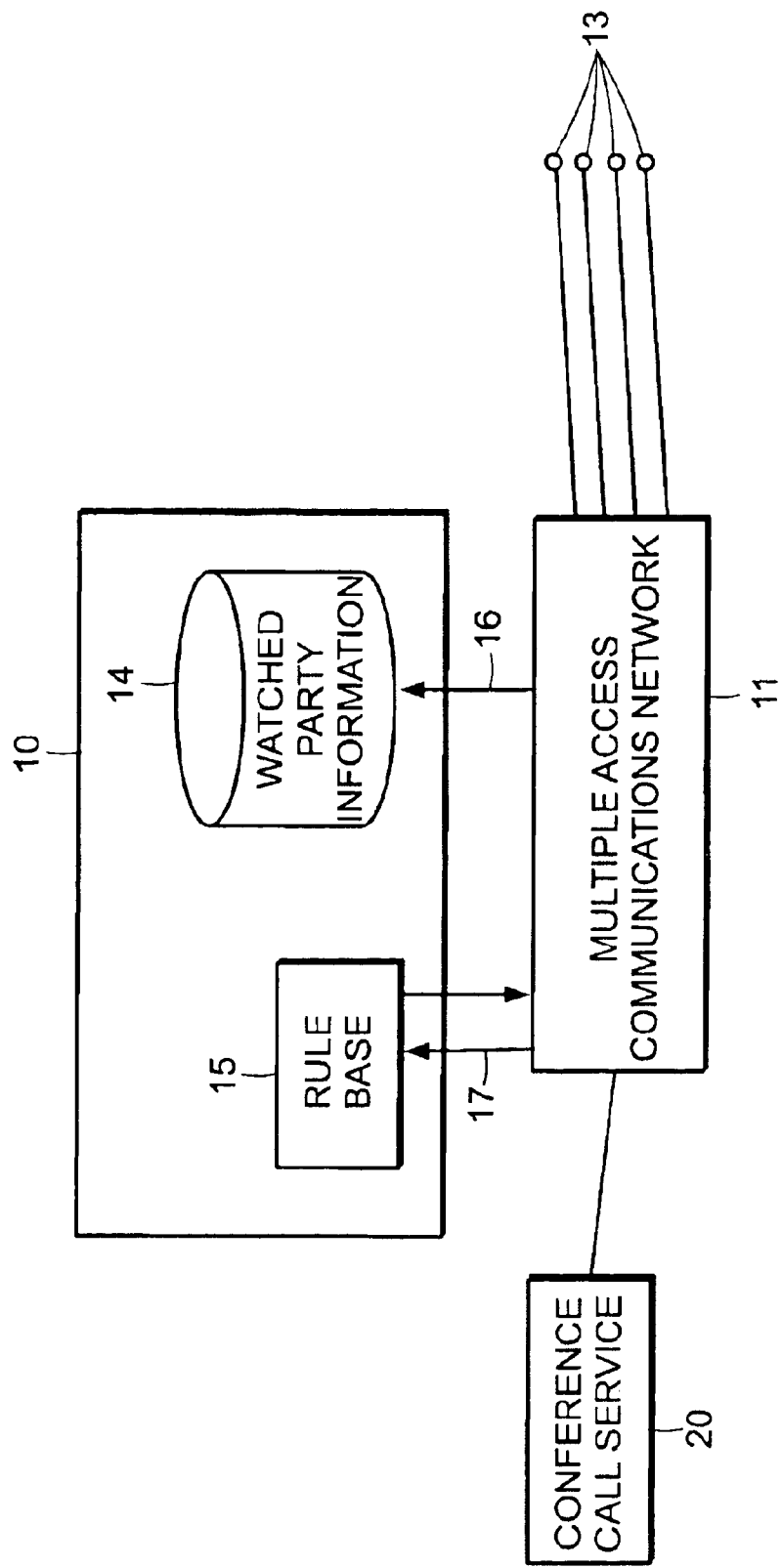
FIG. 4 is a schematic diagram of the personal communications portal of FIG. 3 with a conference call service as a watching party.

A watched party 13 or a watching party 12 may include an individual, a group of individuals, one or more automated services, one or more partially automated services, one or more manual services, etc. For example, as shown in FIG. 4 a watching party 12 may be a conference call service 20 or a computerized cinema ticket service 20, etc. By allowing watching parties 12 or watched parties 13 to be such services it is possible for subscribers of a PCP 10 to be notified of conditions or availability of goods and/or services when they become available or when they reach a designated price target, etc.

Referring to FIG. 4, the conference call service 20 is able to send connect requests to the PCP 10 in the same way that any other watching party 12 may. If the conference call service 20 is required to set up a conference call between three or more watched parties 13, it subscribes with the PCP 10 in order to be notified when changes in the state of the required watched parties 13 occur. The PCP 10 will then inform the watching party 12, (the conference call service 20), when each required watched party 13 becomes available. In this way the conference call service 20 is able to set up a conference call when each required watched party 13 becomes available.

However, since the availability information from the PCP 10 is effectively "real time," if availability of a watched party 13 is withdrawn just after the conference call is attempted, then that watched party 13 may be excluded from the conference call.

The conference call service 20 may also form the watched parties 13 into an aggregate as described in more detail below. Then, once notifications of availability are given for a certain number of group members (e.g. a quorum, all members, etc.), the conference call is attempted.

The watched parties 13 may record preferences and rules 15 about services such as conference call services 20 and these will be taken into account by the PCP 10 when it responds to requests from a conference call service 20. Similarly, for other services that are watching parties 12, watched party 13 preferences, information and rules 15 may be applied.

Figure 5:
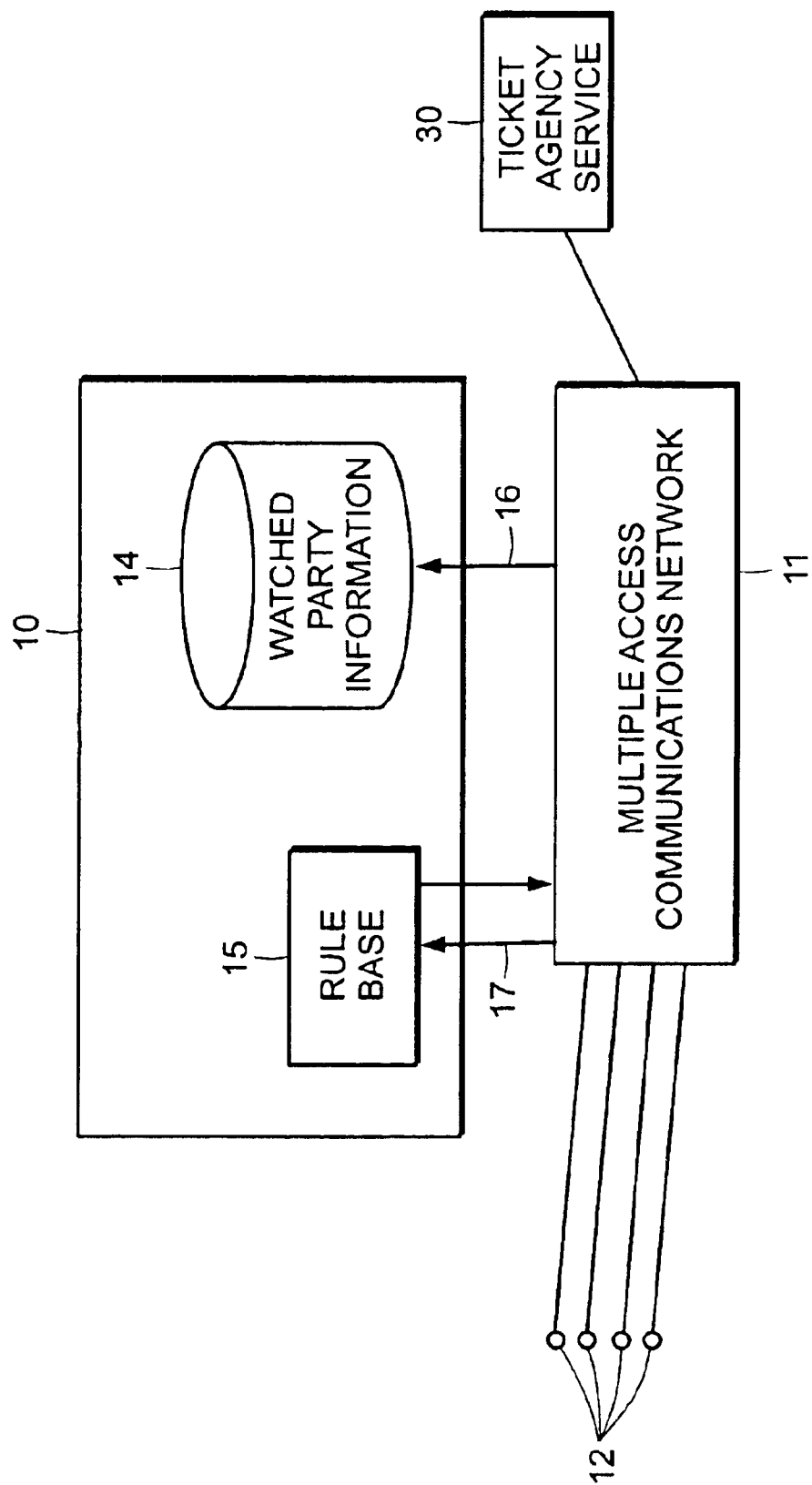
FIG. 5 is a schematic diagram of the personal communications portal of FIG. 3 with a ticket agency service as a watched party.

FIG. 5 illustrates a ticket agency service 30 as a watched party 13. A watched party 13 that is a service is able to store information 14, and rules 15 in the PCP 10 and to register with the system 10 just like other watched parties 13. Watching parties 12 may send connect or notification requests to the PCP 10 regarding the ticket agency service 30. The notification requests may contain a request to be notified of a change of state in the ticket agency service 30 as well as additional information. For example, the notification request could be a request to be notified about a particular type of concert ticket. Many such notification requests by different watching parties 12 may be made of the PCP 10. Then, once tickets for the particular concert become available, the ticket agency service 30 provides information about this to the PCP 10. This information is provided to the PCP 10 by virtue of an agreement between the ticket agency service 30 provider and the PCP 10 provider. As such the event of the tickets becoming available is an example of a "cooked event trigger" as described in more detail below. The PCP 10 is then able to send notifications to each of the interested watching parties 12 to inform them that the tickets are available. Those skilled in the art will recognize that different watching parties 12 may subscribe to different changes in presence about the same watched party 13 and thus may receive different notifications (e.g., some watching parties may subscribe to receive notification that concert tickets become available on a certain date, others may request presence information about a particular seat, or a particular group, etc.).

Other examples of services that may be watched parties 13 include news services, sports scoring services, stockbroker services, etc. Any suitable type of service such as those where members or subscribers require to be informed of changes may be a watched party 13.

Other examples of services that may be watching parties 12 include security services fraud detection services, etc. Another example could be a service, which informs a target user of the nearest available parking lot or spot. This could use information about geographical location of watched parties 13 from the PCP 10. Any suitable type of service such as those where it is required to gain information about activities and communication states of watched parties 13 may be a watching party 12. Other examples include sales contact services which initiate contacts when watched parties 13 are available and expected to be most receptive.

Aggregates

Figure 6:
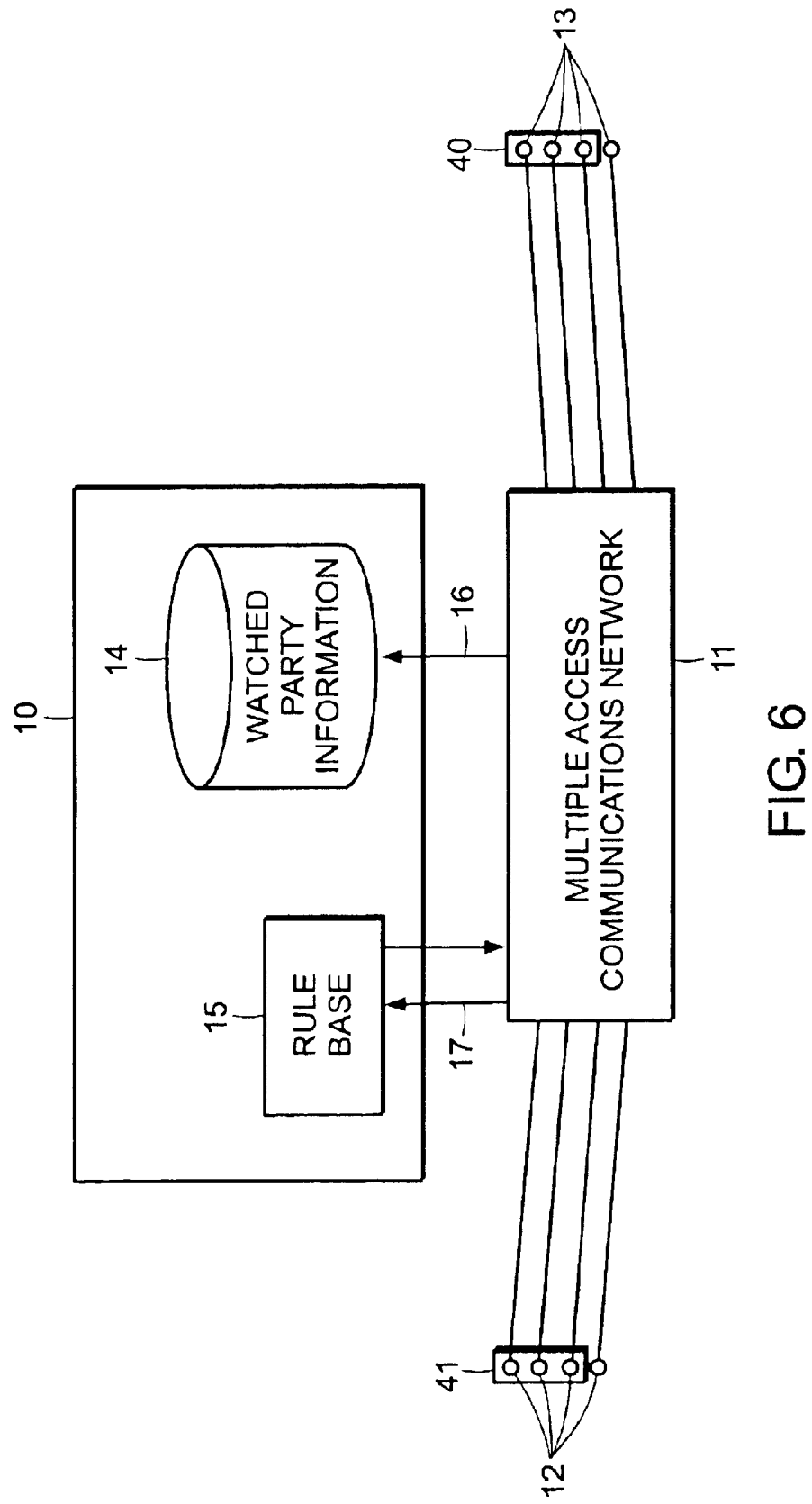
FIG. 6 is a schematic diagram of the personal communications portal of FIG. 3 with an aggregate of watching parties and an aggregate of watched parties.

It is also possible for a watched party 13 to be an aggregate 40 of watched parties 13. Similarly a watching party 12 may be an aggregate 41 of watching parties 12. For example, FIG. 6 shows a situation with an aggregate 40 of watched parties 13 and an aggregate 41 of watching parties 12. For example, several watched parties 13 with a common interest may form an aggregate 40 so that watching parties 12 can monitor the presence of the group 41 of friends as a whole. This could be useful to arrange meetings between the members of the group of friends. In another example, an association of building contractors in a certain geographical region might form an aggregate 40 of watched parties 13 so that they might be easily contactable as a group rather than individually. A further example involves a sales department which may have several operators taking calls (which may be telephone calls, email messages or any other suitable type of call). An aggregate 40 of operators is formed so that watching parties 12 who request a contact with the aggregate 40 are allocated to the first available operator with the relevant communication format. In another example, a workflow application requires a purchase requisition to be signed by two out of a group of five authorized signatories. By using an aggregate 40 for the authorized signatories the request for approval is directed to the most appropriate pair of signatories taking into account factors such as presence of the signatories in the office and current activity of the signatories. There are also many similar reasons why a group 41 of watching parties 12 may be formed.

Aggregates 40, 41 differ from prior-art "buddy lists" (adjuncts to instant messaging services) in several respects. Aggregates 40, 41 are able to request actions on the aggregate's behalf whereas this is not the case for buddy lists, which merely facilitate action by the sender of a message. By creating aggregates 40, 41 which have an autonomous status it is possible to enable aggregates 40, 41 to be used in ways in which watched parties 13 or watching parties 12 can be used.

In order to control membership and existence of an aggregate 40, 41 each aggregate 40, 41 may be allocated one or more owners, who may be chosen from members of the aggregate 40, 41 or an outside party. Only an owner is able to modify or destroy the aggregate 40, 41. In this way membership and existence of the aggregate 40, 41 are controlled. However, other control mechanisms can also be used which do not involve an owner who is a watching party 12 or a watched party 13. For example, a rule base within the PCP 10 could perform this function.

Aggregates 40, 41 may be formed by individual watching parties 12 or watched parties 13 contacting others and forming an aggregate 40, 41. Alternatively, aggregates 40, 41 may be formed dynamically by an application or service, for example, for a specific task. In the case of the conference call service 20 discussed above, this service could form an aggregate 40 of all the watched parties 13 (conferees) who are required members of the conference call. The conference call service 20 monitors the status of the aggregate 40 until a selected minimum of the aggregate 40 members are available for a conference call. The conference call is then set up, starting with the owner of the aggregate 40 (for example). Once the call is set up the aggregate 40 may be destroyed or it may persist until the call is finished so that late comers can be joined to the ongoing call.

An aggregate 40, 41 is able to interact with the PCP 10 in the same way as either a watched party 13 or a watching party 12 as described above except that a "quorum" condition may be used. Those skilled in the art will recognize that an aggregate could allow each member, or a group of members to act for the entire aggregate and the group of members need not be a quorum. For example, when a watched party 13 is an aggregate 40, a determination must be made as to when the PCP 10 should indicate to watching parties 12 that there has been a change of state in the aggregate 40. It could be indicated, e.g., when a predetermined percentage of the members of the aggregate 40 have changed state, or when a specific number of the members of the aggregate 40 have changed state, or alternatively it might be indicated only when all members have changed state. Similarly, when a watching party 12 is an aggregate 41, a "quorum" condition may be used to determine factors relating to requests made by the watching party 12. For example, a determination of when a request should be made and what the request should be. A watched party 13 or a watching party 12 may be a member of more than one aggregate.

Anonymity

The PCP 10 may be arranged to provide a connection address for the watched party 13. This connection address may either be a direct address for that watched party 13 or an indirect or forwarding address. This enables the anonymity of watched parties 13 to be managed in particular situations. For example, the address may be given to the watching party 12 or alternatively may be used by the PCP 10 to forward a connection request from the watching party 12 to the watched party 13. In this latter case, the watching party 12 does not find out the connection address for the watched party 13.

This gives rise to several possibilities. The PCP 10 can provide a direct connection address to the watching party 12. For example, this may be desired for family members and others that are authorized by the watched party 13 to receive a direct connection address.

Alternatively, the PCP 10 can provide an indirect connection address to the watched party 13. In this situation, the watched party 13 sends communications to a forwarding address, functionally equivalent to a post office box, and that entity forwards the communications to the watched party 13. This again means that the watching party 12 does not gain access to the watched party's direct connection address.

In another alternative, the PCP 10 itself forwards communications from the watching party 12 directly to the watched party 13. The watching party 12 still does not gain access to the watched party's direct connection address.

In yet another alternative, the PCP 10 forwards communications from the watching party 12 to a forwarding address. The watching party 12 does not gain access to the watched party's direct connection address and the PCP 10 itself does not "know" this direct address.

The watched party 13 is able to store criteria 14 and rules 15 in the PCP 10 which are used to determine the manner and type of connection address that is provided.

For example, the PCP 10 provides an indirect connection address to the watching party 12 that may only be operable for a limited number of operations. This allows the watched party 13 to limit the number of times that a person is able to make contact (e.g. salespersons, surveyors, etc.). In this way, the watched party 13 is able to control the degree of interaction with particular watched parties 13. Similarly, the PCP 10 can be instructed to forward connection requests from a watching party 12 for a limited period of time. It is also possible to use a combination of these two situations, by providing an indirect connection address to the watching party 12 that is only operable for a limited number of operations within a limited time period. For example, a connection address for use up to four times within one week could be issued.

In another example, the PCP 10 provides an indirect connection address to the watching party 12 that is valid only for a limited number of calls or connection attempts. Further criteria 14 can be used, such as limiting validity to a certain number of successful calls or by terminating validity if an unsuccessful call attempt is made. Also, the PCP 10 can be arranged to forward connection requests from a watching party 12 only for a certain limited number of calls or connection attempts.

Cooked Event Triggers

The capabilities of the PCP 10 are extended by using "cooked event triggers". These may include non-communication-related events that are provided from a third party service and which occur outside the multiple access network 11 (e.g., the watched party 13 checking into a hotel or checking in for an airline flight, entering information into a calendar service, etc.). Information about these events is provided to the PCP 10 via the events gateways 53-1 in protocol 16.

Figure 10:
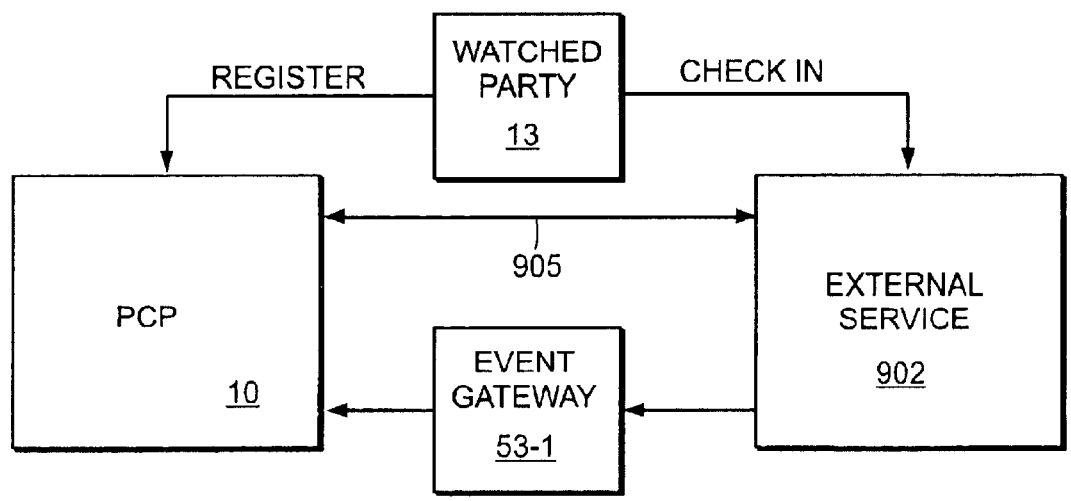
FIG. 10 is a schematic diagram illustrating the use of "cooked event triggers".

FIG. 10 is a schematic diagram illustrating the use of cooked event triggers. The operator of a third-party service 902 such as a hotel registration system or an airline check-in system 902 enters into a business relationship 905 with the provider of a PCP 10. A watched party 13 subscribes to the PCP 10 in order to benefit from the PCP 10 service. When this watched party 13 checks into a hotel using the hotel registration service 902, then by virtue of the prior agreement 905 between the hotel registration service 902 and the PCP 10, information about the check-in event is provided to the PCP 10. The check-in event is referred to as a "cooked event trigger" and is provided to the PCP 10 via an event gateway 53 in an access network (not shown, but to which the system 902 is connected).

When the watched party 13 subscribes to the PCP 10, the watched party 13 is able to specify whether check-in events from the third party hotel registration (or other) service should be made available to the PCP 10. Alternatively, the watched party 13, on using the external service 902, is able to specify whether or not cooked event triggers from that service 902 should be supplied to the PCP 10.

The external service 902 itself may involve human input and non-automated aspects, however, the part of the external service 902 which provides the cooked event triggers to the event gateway 53 is automated.

The PCP 10 effectively models the presence of watched parties 13 with respect to the multiple access network 11 and the cooked event trigger information. Use of cooked event triggers is one way to reduce errors and incorrect responses in locating a mobile watched party 13.

Examples of external services which may provide cooked event triggers include: security badge swipe systems, hotel registration systems, airline check-in systems, automated highway toll collection systems, calling card systems, etc. The term "cooked" is used to refer to the fact that more information is available from cooked events than just geographical location information. That is, context information is gained, associated with different types of events. For example, an airline check-in event at a particular airport generally means not only that the watched party 13 is geographically at the location of the airport but also that the watched party 13 is about to board a plane (for example). This context information is gained quickly, without the need for the PCP 10 to determine that the geographical location is in the airport (for example, from the watched party's mobile telephone location) and then infer that in the context of an airport, the likely outcome is that the watched party 13 is going to board a plane; the check-in information provides this information quickly and accurately. For example, the PCP 10, without the cooked event trigger, may have inferred wrongly that the watched party 13 was going to board a plane when in fact the watched party 13 was merely visiting the airport to collect someone.

More details about the PCP 10 will now be described and several definitions are provided below.

Presence: a quality exhibited by a watched party 13 within a network such as location, availability and/or capability.

Location: a form of spatial co-ordinates for a watched party 13. These may be geographical or more abstract e.g., in terms of network topology. A location may correspond to some addresses.

Availability: the ability of a watched party 13 to communicate at a given time. In addition to "on-line"/"off-line" status, availability can represent a watched party's willingness to engage in communication.

Capability: a measure of forms and capacity of communication a watched party 13 can engage in, e.g. due to constraints imposed by the available devices.

Watched party: the subject of presence information. A watched party 13 may be a person, service, etc.

Aggregate: a set of a watched parties 13 that may act as a single watched party 13. An aggregate has an exposed presence and may be the subject of a subscription.

Watching party: the target for presence information. A watching party 12 may be a person, service, etc. Different watching parties may perceive a different presence for the same watched party 13.

Subscribe: an action of a watching party 12 when it registers an interest in the presence of a watched party 13.

Notify: an action directed at a watching party 12 relating to a change in presence of a watched party 13 that was previously the subject of a subscribe.

Presence indicator: an event external to the presence system that is pertinent to a watched party's presence.

Raw presence: an unprocessed collection of presence indicators (which may be related to a single watched party 13).

Context Presence: an abstract state derived from a watched party's 13 raw presence according to rules defined for that a watched party 13. Not every new presence indicator results in a change to the context presence.

Exposed presence: a view of a watched party's 13 context presence that is exposed to a watching party 12. It is derived according to rules defined for that a watched party 13. Note that a watched party 13 may exhibit a different exposed presence to different audiences.

Audience: a class of potential watching parties 12 defined by, or in relation to, a watched party 13. An actual watching party 12 may be part of one or more audiences for a given watched party 13.

Partial subscribe: a subscribe action that registers interest in part of the presence of a watched party 13. Changes to other parts of that watched party's presence will not lead to a notification. Although a watched party 13 can be composed of other watched parties 13 (see aggregate) the watched party 13 may also have components that are not a watched parties 13 but which can still be discussed in terms of their presence.

Micro-subscribe: a subscribe action that is qualified by the watching party 12 to facilitate differentiation by a watched party's rules between subscriptions by the same watcher. That is, two or more different views of presence could be exposed to a watching party, regarding the same a watched party 13, related to separate micro-subscriptions.

Communication: an interaction involving more than one participant in which information is transferred. A communication is characterized by the pattern of the interaction and by the media of the information transfer.

Interaction pattern: a message interaction, a conversational interaction or a stream interaction, (in the context of this architecture).

Message interaction: an instant message, a deferred message or an acknowledged message.

Instant message: a message that is delivered to the other participant(s) without explicit action on their part.

Deferred message: a message that is delivered to the other participant(s) only after explicit action on their part, e.g. e-mail and voice-mail.

Acknowledged message: a message where the sender cannot engage in another action until the message is delivered to the other participant(s).

Sender: the initiator of a message interaction.

Conversational interaction: an (interleaved) exchange of messages, e.g. an Internet chat session.

Stream interaction: an interaction involving one or more continuous data flows between the participants. Separate flows may go in opposite direction between participants. There may be several distinct flows between the same participants in the same direction. A stream interaction can be classified as simplex, half-duplex or (full) duplex. A 2-way voice call is a stream interaction at the terminal level.

Caller: the initiator of a conversational interaction or a stream interaction.

Media: a form of representation used for transferring information. Possible media are, files, text, audio (including speech), fax, video, etc.

Mediation: the action of transforming one kind of communication into another. This may entail a media transformation and/or an interaction pattern transformation.

Mediated communication: a communication that includes a mediation action.

Proxy communication: a communication in which there is an intermediary between the participants.

Third-party communication: a communication that is initiated by a non-participant.

Service discovery: the process by which something becomes aware of the existence of a relevant service.

Service description: a representation of what a service does in a form that is understood by the service provider and by the user of the service.

Figure 7:
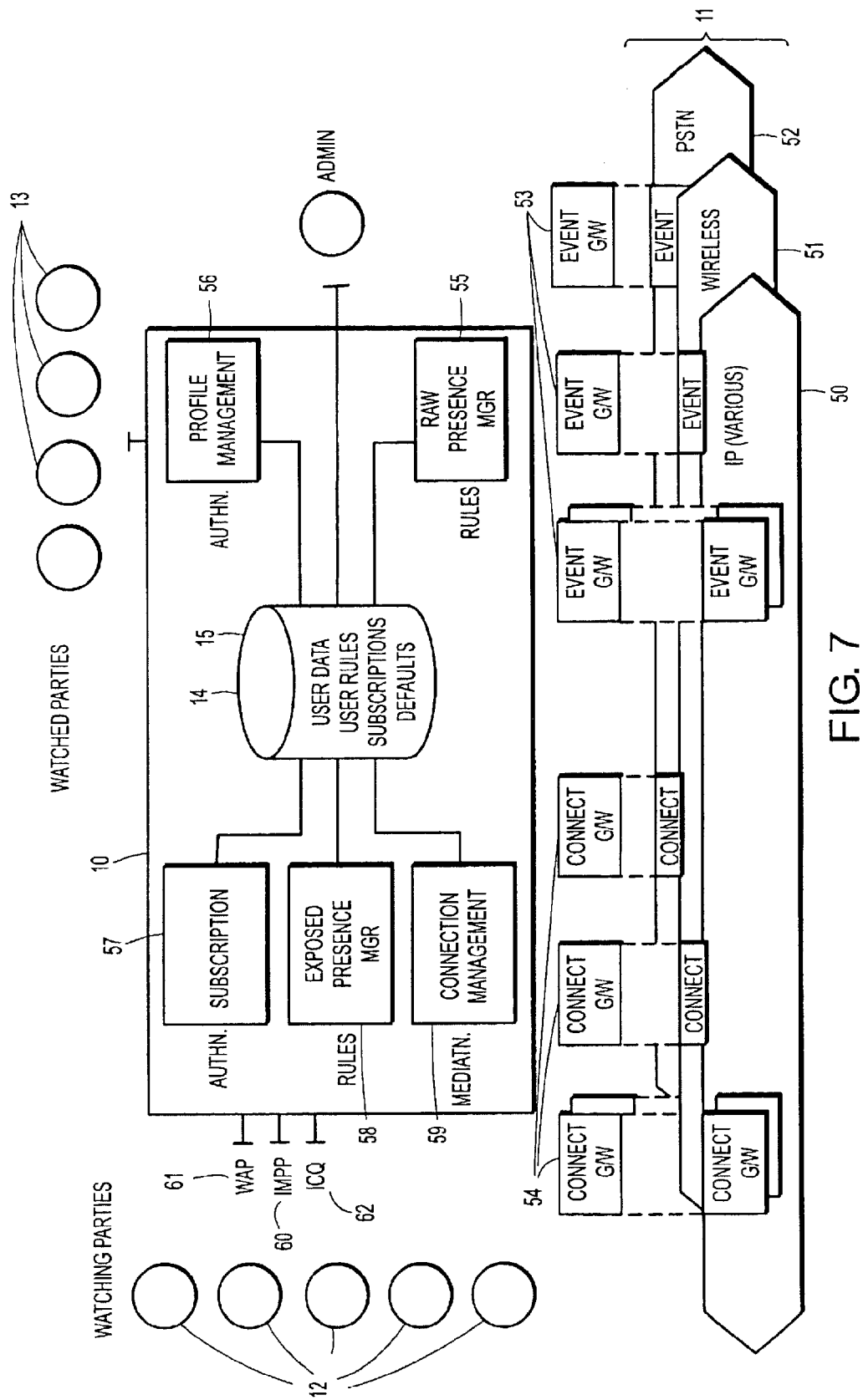
FIG. 7 is a schematic diagram of a personal communications portal.

FIG. 7 shows the PCP 10 of FIG. 3 in more detail. Watching parties 12 and watched parties 13 have access to the PCP 10 via multiple access network 11. In this example the multiple access network 11 comprises an Internet Protocol (IP) communications network 50, a wireless communications network 51, a PSTN 52, and an ISP 76. However, those skilled in the art will realize that different types and combinations of access networks could be used to form the multiple access network 11.

Inputs from the multiple access network 11 to the PCP 10 are provided in the form of event gateways 53. Also, connection requests, from watching parties 12 to the PCP 10 are accepted via connection request inputs which, for example, may be provided using the WAP protocol 61 or ICQ ("I seek you") protocol 62. When the PCP 10 is used to establish connections between watching parties 12 and watched parties 13, a connection from the PCP 10 to the multiple access network 11 is provided in the form of connect gateways 54.

Watched party 13 information 14 and rules 15 are stored in the PCP 10. When a watched party 13 registers to use the PCP 10 a profile of that watched party 13 is built and stored in the PCP 10. A profile management system 56 within the PCP 10 is provided to manage these profiles.

For example, a watched party's profile may contain all or some of the following items, which may be entered by the watched party 13 or may be default information that is prespecified:

Contact addresses for that watched party 13 on each of a number of access networks or component parts of an access network.

A set of the possible context presence values for the watched party 13, e.g. "at-home", "at-work", "travelling", "not-able-to-contact", "unknown", etc. For many of these the system also holds attributes, e.g. geographical location.

Minor changes to the default rules for moving from one context presence to another.

The watched party's own view of what potential audiences its exposed presence has, e.g. family, friends, colleagues. Members of each potential audience may see a different projection of the watched party's presence. In application to enterprises, the administrator is able to provide audience definitions common to many entities (e.g., E-mail distribution lists).

A watching party 12 authentication level for each audience to allow the watched party 13 to have safeguards that a watching party 12 really does belong to an audience.

For some sorts of communication (e.g. instant messages informing of new E-mail) the watched party 13 may wish to exercise fine-grained control and insist on the watching party 12 making a micro-subscription. The attributes of such a subscription can also be subject to a watched party's rules 15 (e.g., E-mail filters)

When a watched party 13 is first registered with a PCP 10 there is a substantial amount of data capture required. In order that the work-load of the watched party 13 is reduced reliance may be placed on default information and a type of "wizard" used to help the watched party 13 enter the required information quickly and easily. Later, the data can be subsequently modified by the watched party 13. These functions are carried out by the profile management system 56.

For example, in the case of a watched party 13 representing a human user (as opposed to an automated service) the interaction provided by the "wizard" data capture process can be as follows:

The watched party 13 chooses from a number of life-styles, "office-worker", "travelling-salesman" or "executive". Each life-style being represented by a template with default values.

Each choice leads to a dialog tailored for that choice. For example, to establish the geographical location of the home and of the office. Additional locations are created if appropriate.

In an embodiment, the PCP 10 is able to detect and capture details about the devices that the watched party 13 uses for communicating.

Definitions of potential audiences for the watched party's presence (family, friends etc.)

Finally, the watched party 13 will decide which contact information is notified to members of which audiences for what changes in context presence.

Some parts of the configuration are complicated and these are initially masked from the watched party 13 until the watched party 13 enters an advanced options mode.

The PCP 10 also contains a raw presence manager 55 which manages an unprocessed collection of presence indicators. The raw presence manager 55 orders the presence indicators into a table or other structure which is indexed by watched party 13. In this way each presence indicated is accessible only in association with the watched party 13 to which it relates. Large volumes of presence indicators can be stored by the raw presence manager 55. However, a process for updating presence indicators or giving weights to these indicators on the basis of age is provided.

The multiple access network 11 is made up of one or more networks, such as a PSTN 52 and a wireless communications network 51. An event gateway 53, specific to the type of network, is provided for each network or each technology, such as telephones and copper wire telephones.

Event gateways 53-1 receive raw data from the access networks, pre-process this and pass it onto the raw presence manager 55 via event gateway 53-2. Examples of these events are keyboard activity on a terminal, movement between cells or change in Visitor Location Register (VLR) in a cellular communications network and off-hook events in a PSTN. Other events include use of the "last offered incoming call" service on a PSTN, details from calendar services and the opening of a Palm Pilot VII™ lid. Event gateways 53 produce an authenticated, time ordered series of location data events that have been filtered and homogenized. That is, only information about watched party 13 being tracked by a particular PCP 10 is passed to that PCP 10's raw presence manager 55. This is achieved by using a filter in the event gateway 53. Also, events are presented to the raw presence manager 55 in a technology-neutral format (all the idiosyncrasies of different access network technology are hidden by the event gateway 53 as far as possible).

An event gateway 53 is divided into two parts. A first part 53-2 interfaces with the PCP 10 while a second part 53-1 interfaces with each access network of multiple access network 11. The two parts 53-1 and 53-2 of the event gateway communicate using a protocol 16 over an interface. Different types of event gateway 53-1 are provided for each of the different types of access network used in multiple access network 11.

A subscription is made when a watching party 12 registers an interest in the presence of a watched party 13. A subscription manager 57 is provided within the PCP 10 in order to manage the subscription process.

Users or services outside of the PCP 10 may subscribe as watching parties 12 to presence information about particular watched parties 13 of the presence system. If the PCP 10 comprises multiple servers this request is routed to the home server for the watched party 13 in question. The subscription request is made over one of a number of protocols: WAP or ICQ, etc. In each case the subscription request contains a return address for notifications, some identification information for the watching party 12 (so that the watched party's propagation restrictions can be obeyed), and the identity of the watched party 13 about whom presence information is sought.

An aspect of the invention provides that the lifetime of a subscription may be controlled by the watching party 12, i.e. the watching party 12 declares when its interest in a given watched party 13 will be over. However, if the watching party 12 does not take action to declare the end of its interest then old subscriptions may eventually become useless. In the case that subscriptions are held persistently (e.g., for fault recovery) an issue of "garbage collection" arises. For example, all subscriptions that are inactive for one hour or some other prescribed time period may be deleted, etc.

In the case of Instant Message notification of an awaiting e-mail, for example, the decision on whether the watched party 13 is "on-line" to a particular e-mail notification may be a function of the sender, the message size, and possibly of keywords within the subject of the e-mail. Rather than the watching party 12 presenting this second order information at the point of sending the Instant Message, the initial subscription may capture all the information upon which the reachability decision is made. What might have been a single subscription by an e-mail notification service regarding a single watched party 13 may then be replaced by a set of fine-grained subscriptions each regarding that watched party's willingness to receive a certain e-mail notification.

The PCP 10 also comprises an exposed presence manager 58 as illustrated in FIG. 7. "Exposed presence" is a view of a watched party's presence that is exposed to a watching party 12. It is derived according to rules 15 defined for that watched party 13 and in this way, a watched party 13 exhibits different exposed presences to different audiences. The function of the exposed presence manager 58 is to "decide" what information to make available to watching parties 12 on the basis of rules 15 and other criteria 14 set by watched parties 13 or defined as defaults.

When a change in the information available, for example, because new information arrives via an event gateway 53, the exposed presence manager 58 is triggered. The exposed presence manager 58 then checks for active subscriptions to the watched party 13 in respect of whom the new information has arrived. If one or more active subscriptions are present, the exposed presence manager 58 consults the rules 15 and determines what (if any) information to make available to the watching parties 12 who have active subscriptions.

The PCP 10 may also have an interface 62 to ICQ and/or WAP 61 protocol outputs. Information that is made available to watching parties 12 who have active subscriptions can be made via this interface 62 or these outputs.

The PCP 10 also includes a connection manager 59 in some examples. When the PCP 10 forwards communication requests directly to watched parties 13, the connection manager 59 provides this forwarding facility using connect gateways 54. At least one connect gateway 54-1 is provided for each type of access network. Part of the function of the connection manager 59 is to "decide" which connect gateway 54 should be used for a particular communication request and to manage changes between connect gateways 54 according to the communication requirements. Further, the connection manager determines which access media is used for a given interaction in the event that more than one access medium is available and suitable.

The connection manager 59 may include a mediation component 59-1 (not shown). This enables messages in one transmission mode (e.g., analog on the PSTN, etc.) to be changed into another transmission mode (e.g., digital), or messages in one signaling format (e.g., voice on a wireless network 5 1) changed into another signaling format (e.g., shortmessage-service (SMS) messages on a wireless network 51, etc.), in order to provide flexibility for watched parties 13 and watching parties 12. The mediation component 59-1 uses rules 15 to decide whether and how to change the transmission mode and/or signaling format of a given message.

The PCP 10 also includes a raw presence manager 55. The raw presence manager 55 obtains and stores information from the event gateways 53 and processes this information to form a "context presence" for each watched party 13. A variety of default contexts are defined such as "at home", "at work desk", "travelling" and information received from the event gateways 53 together with other watched party 13 information is used to determine which context applies for a given watched party 13 at a particular time. Rules 15 are used to aid this determination process. For example, rules 15 for mapping location indicators onto presence contexts are pre-defined. Watched parties 13 are also able to enter their own rules 15 and presence contexts for use by the raw presence manager 55.

The rules 15 used by the raw presence manager 55 and the exposed presence manager 58 are always locally resolvable. Many of the other components of the PCP 10 use rules 15. These may be stored in one rule base or alternatively stored in conjunction with the particular components of the PCP 10. For example, the connection manager 59 uses rules 15 to decide which of several possible connection options to prefer.

The interface between the raw presence manager 55 and the exposed presence manager 58 may be distributed. The two managers 55, 58 have different requirements. The raw presence manager 55 makes only local updates to a data store 14 based on its input data. It exhibits a low latency so that location data from event gateways 53 need not be backed up persistently. That is, once processed by the raw presence manager 55 significant changes are held in the data store 14.

The exposed presence manager 58 engages in a number of external interactions, over a variety of protocols to propagate presence information to subscribers. It is either triggered from the data store 14 in response to the updates made by the raw presence manager 55, or there is a direct interface between the two.

Figure 8:
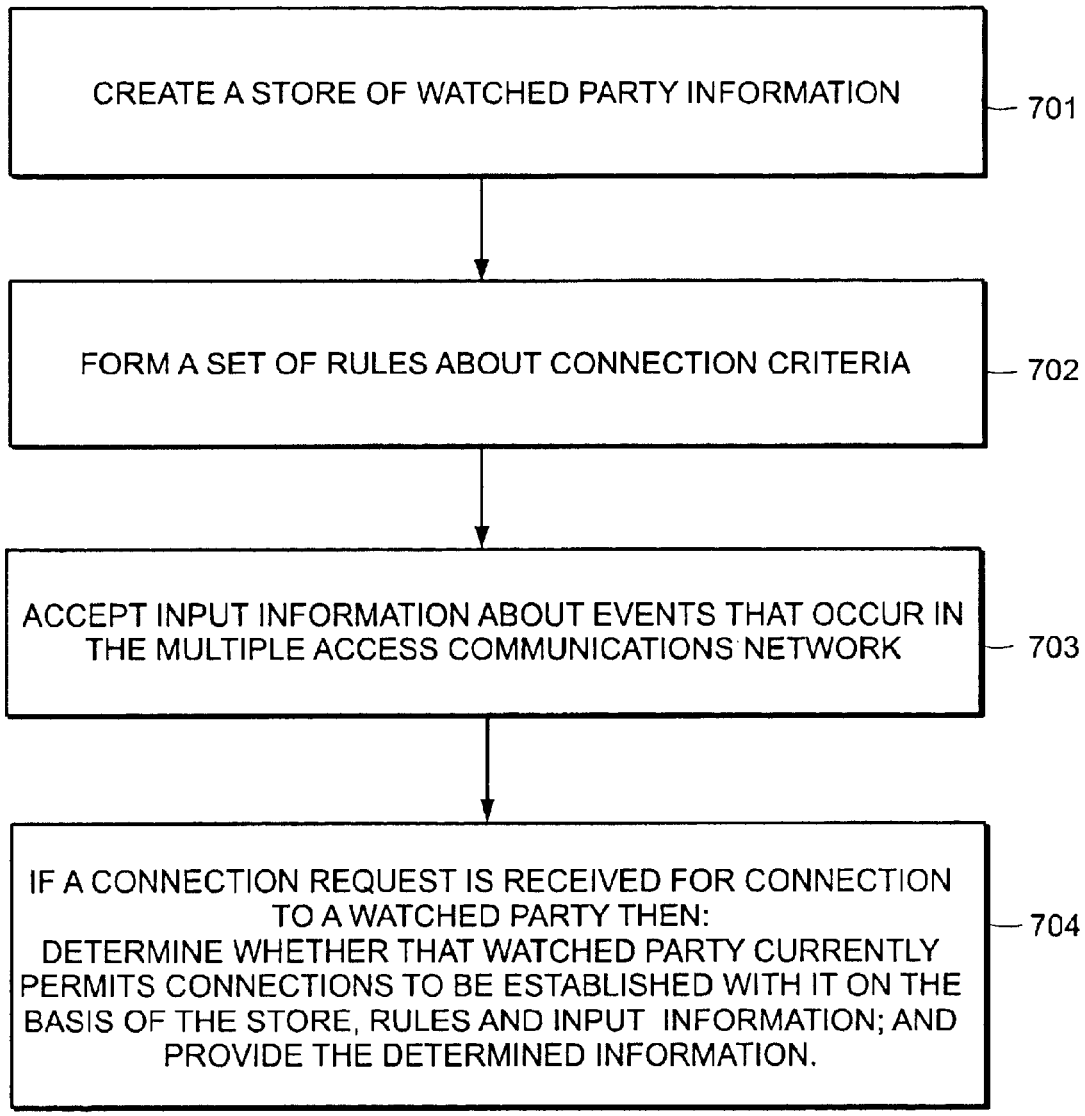
FIG. 8 is a flow diagram for a computer program for controlling a personal communications portal.

In an embodiment a computer program stored on a computer readable medium is provided. FIG. 8 is a flow diagram of the method implemented by the computer program. This computer program is adapted to control a PCP 10 such that connections are managed between watching parties 12 and watched parties 13. This PCP 10 is suitable for use in a multiple access network 11, and this computer program is arranged to control the PCP 10 such that:

(i) a store of watched party 13 information is created (box 701 of FIG. 8);

(ii) a set of rules 15 about connection criteria 14 are formed (box 702 of FIG. 8);

(iii) information about events that occur in said multiple access network 11 is received in use via an input (box 703 of FIG. 8); and (iv) connection requests are received from watching parties 12 in use; and on receipt of a request from a watching party 12 for a connection with a watched party 13, information about whether that watched party 13 currently permits connections to be established with it is provided, said information being determined on the basis of said store, said rules 15 and said input information about events; and wherein at least one party is a service (box 704 of FIG. 8).

Figure 9:
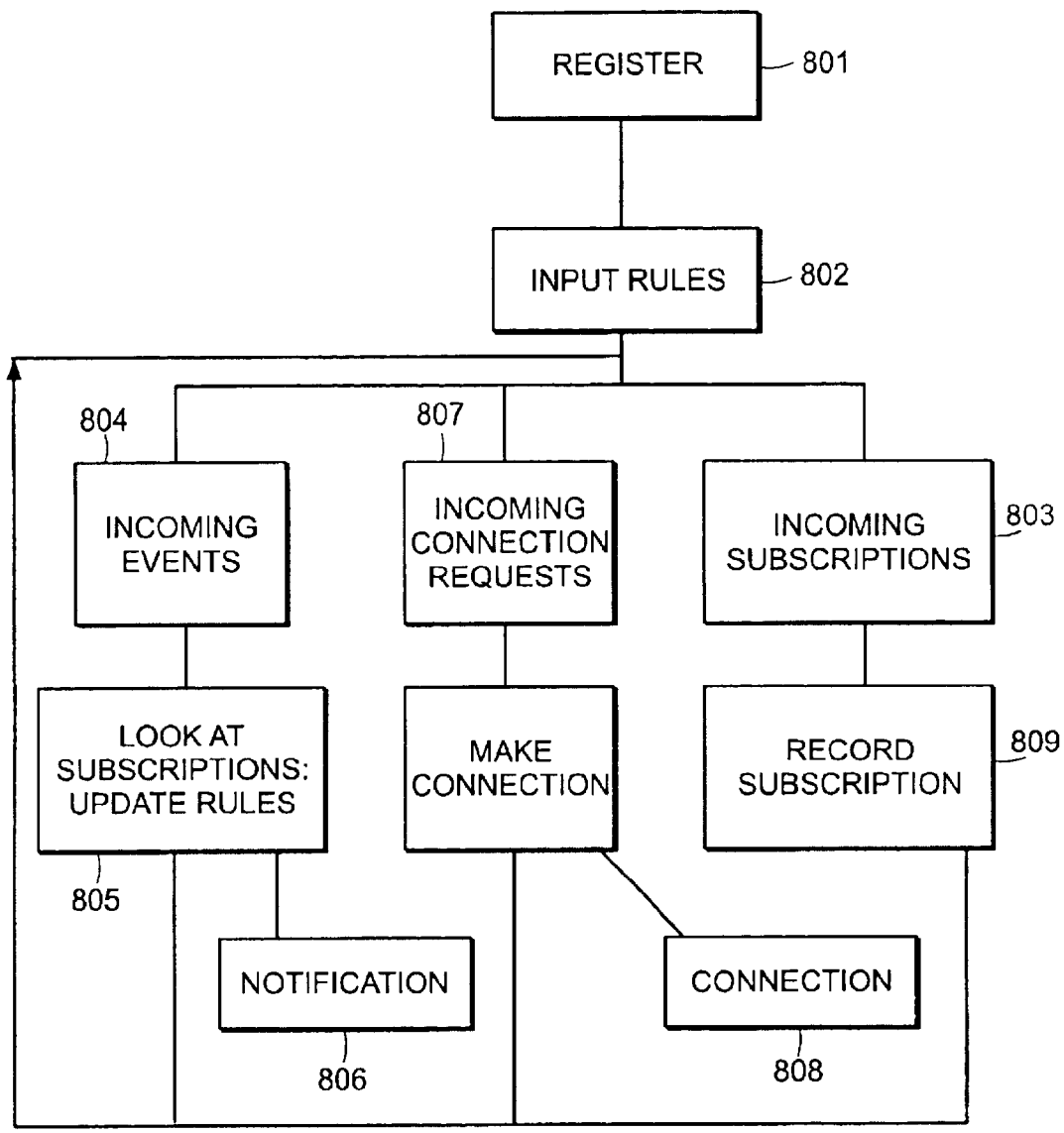
FIG. 9 is a flow diagram for another example of a computer program for controlling a personal communications portal.

FIG. 9 is a flow diagram of another example of such a method implemented by a computer program. In this case, watched parties 13 first register 801 with a PCP 10 and input information 802 which is used to form rules 15. This information is about the watched party's communication criteria 14 and preferences, such as what types of terminal he or she uses and which modes of communication are preferred at different times of the day.

The PCP 10 may then receive a number of different types of input. For example, a subscription 803 from a watching party 12 may be received, in which case the subscription details are recorded 809. For example, this could be a request by a watching party 12 to be informed about any change of state in a watched party 13.

The PCP 10 may also receive an incoming event 804. In this case, the method involves checking 805 all the current subscriptions to see if the incoming event is relevant to any of these. If so, notifications are sent out 806 to the watching parties 12 who made the relevant subscriptions. The record of the subscriptions is then updated 805. For example, a subscription may be arranged to be activated only once and then deleted.

The PCP 10 may also receive an incoming connection request 807 from a watching party 12. In this case the PCP 10 checks the availability of the watched party 808 and if appropriate establishes a connection or forwards the connection request to the watched party 808.

A range of applications are within the scope of the present invention. These include any PCP 10 in which watched parties 13 or watching parties 12 may be services. The invention also encompasses a computer program for controlling such a PCP 10 and a multiple access network 11 which comprises such a PCP 10.

It will thus be seen that the invention attains the advantages set forth above, among those made apparent from the preceding description. Those skilled in the art will appreciate that the configurations depicted in FIGS. 2 through 10 illustrate the present invention.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by letters patent is:

1. Apparatus for monitoring a presence of at least one watched party via a plurality of communications devices on a multiple access network comprising a plurality of access networks, wherein said plurality of access networks comprises communications networks of different types, the apparatus comprising:

a processor coupled to said multiple access network;

a plurality of event detectors, each operatively connected between at least one of said plurality of access networks and said processor;

wherein each of said event detectors is configured to detect a change in presence of the watched party, including device movement and device activity, on the respective access network and communicate a presence status to said processor based upon said change in presence on said respective access network; and wherein said presence status includes indication of whether said watched party is available for contact on said multiple access network, and wherein said processor is operative to determine at least in-part from presence status which ones of the plurality of communication devices is available to the watched party, whereby a single identifier can be employed to initiate communication with the watched party.

2. The apparatus according to claim 1 wherein said processor is configured to collect said presence status from each of said plurality of event detectors and to correlate said presence status from each of said event detectors to determine said presence of said watched party on said multiple access network.

3. The apparatus according to claim 2 wherein each of said plurality of access networks is respectively associated with a different mode of transmission, and wherein said presence of said watched party on said multiple access network comprises:

an indication of an active presence status of said watched party on each of said plurality of access networks over which said watched party maybe contacted.

4. The apparatus according to claim 3 wherein said presence of the watched party on said multiple access network further comprises:

an indication of said mode of transmission for a particular access network on which said watched party has an active presence status.

5. The apparatus according to claim 3 wherein said presence of the watched party on said multiple access network further comprises:

an indication of a physical location of said watched party based upon said correlation of said presence status from said plurality of event detectors.

6. The apparatus according to claim 3 wherein said presence of the watched party on said multiple access network further comprises:

an indication of a contextual situation of said watched party based upon said correlation of said presence status from said plurality of event detectors.

7. The apparatus according to claim 1 wherein said processor is configured to receive requests from at least one watching party for said presence of said watched party on said multiple access network; and wherein said processor is configured to provide said watching party with said presence of said watched party on said multiple access network.

8. The apparatus according to claim 1 comprising:

a plurality of connectors, each operatively connected between said processor and at least one of said plurality of access networks, wherein each of said plurality of connectors is configured to provide a communication path between said processor and said at least one of said plurality of access networks.

9. The apparatus according to claim 8 wherein said processor is configured:

to store said presence status communicated from said plurality of event detectors;

to receive a request from a watching party to communicate with said watched party;

to determine, according to said stored presence status of the watched party, a path over an access network wherein the watched party has an active presence status over which said watched party may be contacted; and, to command said connector associated with the access network of the watching party and said connector associated with the access network wherein the watched party has an active presence to establish a communication path between the watching party and the watched party.

10. The apparatus according to claim 9 wherein said request includes a destination address and a transmission format for communicating with said watched party.

11. The apparatus according to claim 9 wherein a communication between said watching party and said watched party comprises a text message provided by the watching party.

12. The apparatus according to claim 9 wherein a communication between said watching party and said watched party comprises a voice message provided by the watching party.

13. The apparatus acing to claim 9 wherein a communication between said watching party and said watched party comprises a continuous stream communication.

14. The apparatus according to claim 10 wherein said connector is configured to mediate a communication between said watching party and said watched party when said mode of transmission associated with an access network employed by the watching party is different from a mode of transmission associated with an access network employed by said watched party.

15. The apparatus according to claim 10 wherein said connector is configured to mediate a communication between said watching party and said watched party when a signaling format associated with a terminal device employed by the watching party is different from a signaling format associated with a terminal device employed by said watched party.

16. A method of monitoring a presence of at least one watched party via a plurality of communications devices on a multiple access communication network comprising a plurality of access networks, wherein said plurality of access networks comprises communications networks of different types, the method comprising:

detecting a presence status of said watched party on each of said plurality of access networks by detecting device movement and device activity;

reporting said presence status for each of said access networks to a central location;

detecting a change in said presence status on at least one of said access networks;

reporting said change in presence status to said central location; and wherein said presence stats includes indication of whether said watched party is available for contact on said multiple access network, whereby a single identifier can be employed to initiate communication with the watched party.

17. The method according to claim 16 further comprising:

storing said presence status of said watched party on each of said plurality of access networks; and, correlating said presence status to determine said presence status of said watched party on said multiple access network.

18. The method according to claim 17 further comprising:

storing said change in presence status of said watched party on said plurality of access networks; and correlating said presence status and said change in presence status to determine said presence status of said watched party on said multiple access network.

19. The method according to claim 16 wherein each of said plurality of access networks is respectively associated with a different mode of transmission, and wherein said method of monitoring said presence of said watched party on said multiple access network further comprises:

indicating an active presence status of said watched party on each of said plurality of access networks over which said watched party may be contacted.

20. The method according to claim 16 wherein each of said plurality of access networks is respectively associated with a different mode of transmission, and wherein said method of monitoring a presence of said watched party on said multiple access network further comprises:

indication said mode of transmission for a particular access network on which said watched party has an active presence status.

21. The method according to claim 16 wherein each of said plurality of access networks is respectively associated with a different mode of transmission, and wherein said method of monitoring a presence of said watched party on said multiple access network further comprises:

indicating a physical location of said watched party based upon said correlation of said presence status for each of said plurality of access networks.

22. The apparatus of claim 21 wherein said presence of the watched party on said multiple access network further comprising:

an indication of a contextual situation of said watched party based upon said correlation of said presence status from said plurality of event detectors.

23. The method according to claim 16 further comprising:

receiving requests from at least one watching party for said presence of said watched party on said multiple access network; and providing said watching party with said presence of said watched party on said multiple access network.

24. The method according to claim 16 further comprising:
providing a connection gateway between said central location and each of said plurality of access networks which provides a communication path between a central location and each of said plurality of access networks.

25. The method according to claim 16 further comprising:
storing said presence status communicated from said access networks at said central location;
receiving a request from a watching party to communicate with said watched party;
determining an access network over said watched party may be contacted; and, establishing a communication path between the watching party and the watched party.

26. The method according to claim 25 further comprising:
receiving from said watching party said request including a destination address and a transmission format for communicating with said watched party.

27. The method according to claim 25 further comprising:
communication a text message from said watching party to said watched party.

28. The method according to claim 25 further comprising:
communicating a voice message from said watching party to said watched party.

29. The method according to claim 25 further comprising:
maintaining a continuous stream communication between said watching party and said watched party.

30. The method according to claim 25 further comprising:
converting a communication from said watching party which is transmitted in one transmission mode into a communication which is transmitted in a different transmission mode which is receivable by said watched party.

31. The method according to claim 30 wherein said transmission modes are dependent upon said access networks employed by said watching party and said watched party.

32. The method according to claim 30 wherein said transmission modes are dependent upon a device employed by said watching party and a device employed by said watched party.

33. Apparatus for monitoring a presence of at least one watched party via a plurality of communications devices on a multiple access network comprising a plurality of access networks, wherein said plurality of access networks comprises communications networks of different types, the apparatus comprising:
processor means for processing presence information about said watched party,
detection means, operatively connected between said plurality of access networks and said processor means, for detecting a presence status of said watched party on said plurality of access networks and for detecting a change in said presence status on said plurality of access networks by detecting device movement and device activity; and
wherein said presence status includes indication of whether said watched party is available for contact on said multiple access network,
whereby a single identifier can be employed to initiate communication with the watched party.

34. The apparatus according to claim 33 wherein said processor means is configured to collect said presence status from said detection means and to correlate said presence status to determine said presence of said watched party on said multiple access network.

35. The apparatus according to claim 34 wherein each of said plurality of access networks is respectively associated with a different mode of transmission, and wherein said presence of said watched party on said multiple access network comprises:
an indication of an active presence status of said watched party on each of said plurality of access networks over which said watched party ray be contacted.

36. The apparatus according to claim 35 wherein said presence of the watched party on said multiple access network further comprises:
an indication of said mode of transmission for a particular access network on which said watched party has an active presence status.

37. The apparatus according to claim 35 wherein said presence of the watched party on said multiple access network further comprises:
an indication of a physical location of said watched party based upon said correlation of said presence status.

38. The apparatus according to claim 37 wherein said presence of the watched party on said multiple access network further comprises:
an indication of a contextual situation of said watched party based upon said correlation of said presence status from said plurality of event detectors.

39. The apparatus according to claim 33 wherein
said processor means is configured to receive requests from at least one watching party for said presence of said watched party on said multiple access network; and
wherein said processor means is configured to provide said watching party with said presence of said watched party on said multiple access network.

40. The apparatus according to claim 33 further comprising:
connector means operatively connected between said processor means and at least one of said plurality of access networks, for providing a communication path between said processor means and said at least one of said plurality of access networks.

41. The apparatus according to claim 40 wherein said processor means is configured:
to store said presence status communicated from said detector means;
to receive a request from a watching party to communicate with said watched party;
to determine, according to said stored presence status of the watched party, a path over an access network where the watched party has an active presence status over which said watched party maybe contacted; and,
to command said connector means to establish a communication path between the watching party and the watched party.

42. The apparatus according to claim 41 wherein said request includes a destination address and a transmission format for communicating with said watched party.

43. The apparatus to claim 41 wherein a communication between said watching party and said watched party comprises a text message provided by the watching party.

44. The apparatus according to claim 41 wherein a communication between said watching party and said watched party comprises a voice message provided by the watching party.

45. The apparatus according to claim 41 wherein a communication between said watching party and said watched party comprises a continuous steam communication.

46. The apparatus according to claim 42 further comprising mediation men for mediating a communication between said watching party and said watched party when said mode of transmission associated with an access network employed by the watching party is different from a mode of transmission associated with an access network employed by said watched party.

47. The apparatus according to claim 42 further comprising mediation means for mediating a communication between said watching party and said watched party when a signaling format associated with a terminal device employed by the watching party is different from a signaling format associated with a terminal device employed by said watched party.

\* \* \* \* \*